A. HRABOVSKY.
AUTOMOBILE WHEEL.
APPLICATION FILED MAR. 29, 1918.
1,296,665.
Patented Mar. 11, 1919.
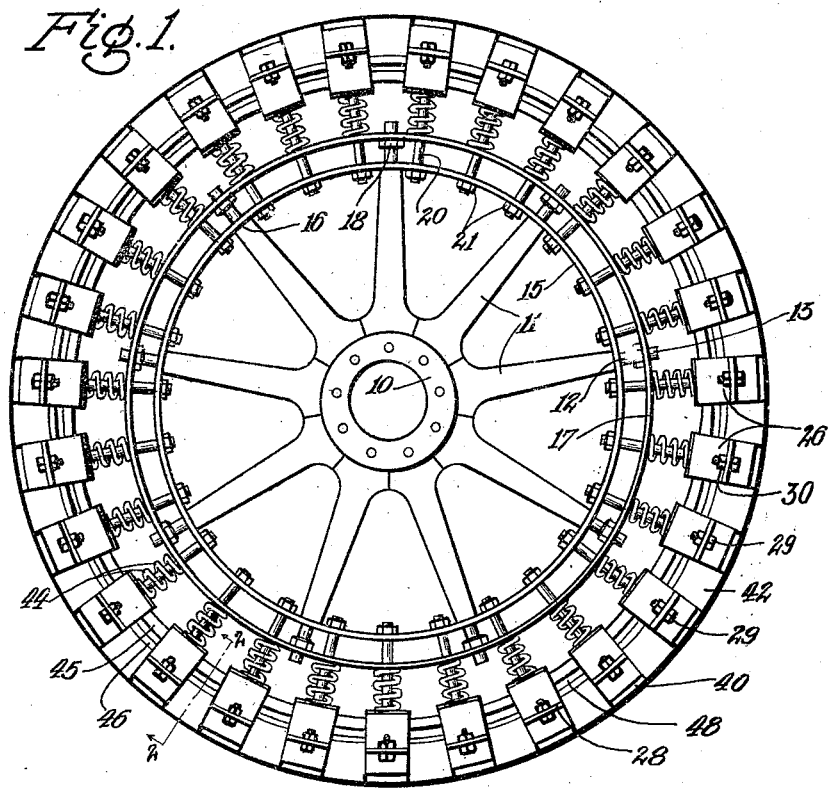
INVENTOR
Andrej Hrabovsky
BY
ATTORNEY

UNITED STATES PATENT OFFICE.

ANDREJ HRABOVSKY, OF PHILADELPHIA, PENNSYLVANIA.

AUTOMOBILE-WHEEL.

1,296,665.  Specification of Letters Patent.  Patented Mar. 11, 1919.

Application filed March 29, 1918. Serial No. 225,394.

*To all whom it may concern:*

Be it known that I, ANDREJ HRABOVSKY, a subject of the King of Hungary, residing at Philadelphia, county of Philadelphia, and State of Pennsylvania, have invented certain new and useful Improvements in Automobile-Wheels, of which the following is a specification.

This invention relates to improvements in wheels and particularly of the better grade as used upon automobiles and like vehicles.

The principal object of the invention is to provide a wheel having a highly resilient tire and in which is avoided the use of a pneumatic cushioning means.

A still further object is to provide a wheel of extreme simplicity of character, not readily liable to become dis-organized and which is well adapted for continuous service.

These and other like objects are attained by the novel construction and combination of parts hereinafter described and shown in the accompanying drawing, forming a material part of this disclosure, and in which:—

Figure 1 is a side elevational view showing a wheel made in accordance with the invention.

Fig. 2 is an enlarged transverse sectional view taken on line 2—2 of Fig. 1, and Fig. 3 is a side elevational view, showing a novel form of wrench by means of which the several nuts may be readily adjusted.

The wheel comprises a central hub 10, to which are rigidly attached a plurality of spokes 11, having reduced cylindrical extensions 12, screw-threaded at their extremities 13. A relatively rigid band or ring 15, is drilled to receive the extensions 12, the band being seated upon the shoulders 16 of the spokes while an outer band 17, is held upon the threaded ends 13, by means of the nuts 18, which obviously may be adjusted to hold the band concentric with the inner band 15.

Passing through both bands 15 and 17, are spindles 20 provided with adjusting nuts 21, the same contacting against the inner periphery of the inner band 15, while the outer end of the spindles are formed with heads 23, seated in sockets or cavities 24 formed in the bracket elements 25, which support the tire.

Extending outwardly at right angles from the transversely disposed elements 25 of the brackets are vertical limbs 26, and 26′ from the former of which extends U shaped projections 28, the two parts of the loop being engaged by a bolt 29 provided with a clamp nut 30, which upon being operated, bring the parts together so as to force the hooked, inwardly extending elements 31, toward the main portion 25 of the brackets.

From the other limbs 26′ extend horizontal elements 32, engageable by similar bolts 29 having nuts 30, by which is secured the clamp elements 33, one part 34 of which makes contact with the extending element 32, while an inner extending element 35 is formed parallel and opposite to the element 31, formed with the loop 28.

These two inwardly projecting elements are adapted to engage in recesses 40, formed at regularly spaced intervals, in the outer corners of the tread 42, which is preferably made of rubber or like pliable, elastic material.

Interposed between the periphery of the outer fixed band 17, and the outer surface of the sockets, are a plurality of coiled compression springs 44, the springs encircling the stems or spindles 20, so as to be retained in operative position.

Within and resting upon the elements 25 of the brackets, is a continuous band 45 preferably of leather or strong woven textile fabric and spaced exteriorly thereof, is a similar band 46 acting as a base for the tread element 42.

Interposed between the continuous bands 45 and 46 are reinforcing elements 48, preferably comprising a plurality of wires, connected at their ends so as to form continuous bands, which encircle and constrain the inner band 45 tightly against the interior portion of the brackets.

In order to provide a convenient means for manipulating the several nuts and bolts, a bar 50 is formed with a longitudinal slot 51, in which is mounted a spindle 52, one of the extending ends having attached to it a crank lever 53 provided with an operating handle 54, while mounted upon this spindle 52 is a pulley 55, conveying motion through the belt or chain 56 to another pulley 57, mounted upon a stem 58, having a rectangular recess 59, formed in the extension 60, the same acting as a wrench and suited to the several nuts so that the tread element 42 may be readily removed or replaced.

From the foregoing it is believed that the construction, operation, and use of the wheel

Having thus described my invention what I claim as new and desire to secure by Letters Patent, is.

1. In a wheel, the combination with an inner and outer band, said inner band being supported by the spokes of the wheel, of a tread having spaced recesses formed at intervals upon its exterior edges, spindles passing through said bands, brackets with which said spindles are engaged, said brackets having parts engageable within the mentioned recesses in said tread, and means for clamping said tread to said brackets.

2. In a wheel, the combination with a pair of fixed spaced bands, spindles extending therethrough, brackets having extensions carried at the ends of said spindles, springs interposed between the outer of said bands and the bases of said brackets, a continuous tread having regularly spaced recesses formed upon opposite sides engageable with the extensions of said brackets, means for clamping said brackets thereto, a pair of flexible endless bands supported in said brackets on which said tread rests and a reinforcing means disposed between said flexible bands.

3. In an automobile wheel, the combination with a pair of concentrically spaced rigid bands, spindles extending through said bands, brackets secured on the ends of said spindles, springs interposed between the outermost of said bands and the bases of said brackets, an endless tread element having opposed peripheral recesses upon either side thereof, hooked elements and clamp elements formed with said brackets engageable in the mentioned recesses on opposite sides of said tread element, a pair of endless spaced flexible bands arranged circumjacent to said brackets, said tread resting upon the outer of said bands, and a plurality of wires interposed between said flexible bands and acting as a reinforcement therefor.

In testimony whereof I have affixed my signature.

ANDREJ HRABOVSKY.

Copies of this patent may be obtained for five cents each, by addressing the "Commissioner of Patents, Washington, D. C."